United States Patent
Bergkvist et al.

(10) Patent No.: US 11,908,059 B2
(45) Date of Patent: Feb. 20, 2024

(54) DEVICES AND RELATED METHODS FOR PROVIDING ENVIRONMENTS

(71) Applicant: Sony Group Corporation, Tokyo (JP)

(72) Inventors: Hannes Bergkvist, Basingstoke (GB); Peter Exner, Basingstoke (GB); Peter Blomqvist, Basingstoke (GB); Anders Isberg, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/695,056

(22) Filed: Mar. 15, 2022

(65) Prior Publication Data

US 2022/0358706 A1    Nov. 10, 2022

(30) Foreign Application Priority Data

Mar. 31, 2021   (SE) .................................. 2150408-9

(51) Int. Cl.
| | |
|---|---|
| *G06T 13/40* | (2011.01) |
| *G06T 7/70* | (2017.01) |
| *G06T 19/00* | (2011.01) |
| *G06F 3/01* | (2006.01) |

(52) U.S. Cl.
CPC .............. *G06T 13/40* (2013.01); *G06F 3/011* (2013.01); *G06T 7/70* (2017.01); *G06T 19/006* (2013.01)

(58) Field of Classification Search
USPC .......................................... 345/419–427, 633
See application file for complete search history.

(56) References Cited

U.S. PATENT DOCUMENTS

| | | | |
|---|---|---|---|
| 8,954,527 B2 | 2/2015 | Edecker et al. | |
| 10,721,280 B1 * | 7/2020 | Heppner | H04L 65/403 |
| 10,852,838 B2 | 12/2020 | Bradski et al. | |
| 10,979,672 B1 * | 4/2021 | Krol | G06F 3/011 |
| 11,049,072 B1 * | 6/2021 | Little | G06Q 10/10 |
| 11,140,361 B1 * | 10/2021 | Krol | H04N 7/157 |
| 11,200,742 B1 * | 12/2021 | Post | G06T 19/003 |
| 2009/0005140 A1 | 1/2009 | Rose | |
| 2009/0251471 A1 * | 10/2009 | Bokor | G06T 13/40 |
| | | | 345/474 |

(Continued)

FOREIGN PATENT DOCUMENTS

| | | |
|---|---|---|
| EP | 3331240 A1 | 6/2018 |
| JP | 5207216 B2 | 6/2013 |

OTHER PUBLICATIONS

Pedro Girão, João Paulo, Luís Garrote, Paulo Peixoto, "Real-Time Multi-view Grid Map-Based Spatial Representation for Mixed Reality Applications", 2018, AVR 2018: Augmented Reality, Virtual Reality, and Computer Graphics, pp. 322-339, https://doi.org/10.1007/978-3-319-95270-3_27 (Year: 2018).*

(Continued)

*Primary Examiner* — Michael J Cobb
(74) *Attorney, Agent, or Firm* — Tucker Ellis LLP

(57) ABSTRACT

A server device is configured to provide a combined environment and includes processor circuitry configured to determine first parameters indicative of a first location, generate first environment data indicative of the first location, determine second parameters indicative of a second location, and associate the second parameters with the first environment data for providing combined environment data, and output the combined environment data.

11 Claims, 8 Drawing Sheets

(56) References Cited

U.S. PATENT DOCUMENTS

| | | | |
|---|---|---|---|
| 2010/0125799 A1* | 5/2010 | Roberts | G06F 3/011 |
| | | | 715/757 |
| 2012/0192088 A1 | 7/2012 | Sauriol et al. | |
| 2012/0315986 A1 | 12/2012 | Walling | |
| 2017/0006343 A1 | 1/2017 | Miller | |
| 2017/0302709 A1 | 10/2017 | Jones et al. | |
| 2018/0232934 A1 | 8/2018 | Schmidt | |
| 2020/0322575 A1* | 10/2020 | Valli | G03B 21/00 |
| 2022/0124283 A1* | 4/2022 | Krol | G06F 30/13 |
| 2022/0124286 A1* | 4/2022 | Punwani | G06F 3/04815 |
| 2022/0277565 A1* | 9/2022 | Haro | G06V 40/23 |
| 2023/0007085 A1* | 1/2023 | Berliner | H04W 4/80 |
| 2023/0326092 A1* | 10/2023 | McTernan | G06F 3/011 |
| | | | 345/619 |

OTHER PUBLICATIONS

Michael Gradmann, Eric M. Orendt, Edgar Schmidt, Stephan Schweizer, Dominik Henrich, "Augmented Reality Robot Operation Interface with Google Tango", 2018, ISR 2018; 50th International Symposium on Robotics, pp. 1-8 (Year: 2018).*

Office Action and Search Report from corresponding Swedish Application No. 2150408-9, dated Nov. 23, 2021, 8 pages.

* cited by examiner

DEVICES AND RELATED METHODS FOR PROVIDING ENVIRONMENTS

CROSS REFERENCE TO RELATED APPLICATIONS

The present application claims priority to Swedish Patent Application No. 2150408-9, filed Mar. 31, 2021, the content of which is incorporated herein by reference in its entirety.

TECHNICAL FIELD

The present disclosure pertains generally to the field of virtual environments, and more specifically to the generation of combined virtual environments. The present disclosure relates to server devices, electronic devices, and related methods.

BACKGROUND

In remote, such as an online or hybrid, working setups, it may be challenging to find the best way to communicate and/or interact with co-workers between meetings. In an ordinary office setting, interactions and/or communications occur at different social areas of the office, such as the coffee machine, canteens, or lounge areas. This is not possible in online and hybrid working setups.

Additionally, for quick questions or discussions in an office setting, it is possible to physically seek out a person at their desk or other places, and further to first observe if the person seems to be busy or seems available. Currently for online and hybrid working setups, the only indication of availability are virtual statuses, such as available/busy/away statuses in the common chat and/or meeting applications and/or calendars.

SUMMARY

There is a need for a way to interact with co-workers between meetings in a remote work setup. Further, there is a need to provide a more informed and/or nuanced view of co-worker's availability.

Accordingly, there is a need for devices and related methods which may mitigate, alleviate or address the existing shortcomings, and provide an improved system for interacting with and or receiving an informed and/or nuanced view of co-workers in a remote work setting.

Disclosed is a server device. The server device can be configured to provide a combined environment. The server device comprises memory circuitry. The server device comprises interface circuitry. The server device comprises processor circuitry. The processor circuitry is configured to determine, based on first data, first parameters indicative of a first location. The processor circuitry is configured to generate, based on the first parameters, first environment data indicative of the first location. The processor circuitry can be configured to determine, based on second data, second parameters indicative of a second location. The processor circuitry is configured to associate second parameters with first environment data for providing combined environment data. The processor circuitry is configured to output the combined environment data.

Also disclosed is a method. The method can be performed by a server device configured to provide a combined environment. The method can comprise determining, based on first data, first parameters indicative of a first location. The method can comprise generating, based on the first parameters, first environment data indicative of the first location. The method can comprise determining, based on second data, second parameters indicative of a second location. The method comprises associating second parameters with first environment data for providing combined environment data. The method comprises outputting the combined environment data.

It is an advantage of the present disclosure that a combined environment can be generated from two or more different locations. The combined environment can be a virtual environment, accessible by a number of users. The combined environment can reflect locations and/or activities of avatars representative of persons within the combined environment with improved accuracy. This can allow for improved interactions to occur in a remote work setting, which may be timelier. Further, this can allow for more discussion as workers may have a more accurate information regarding a co-worker's context and availability.

Also disclosed is an electronic device. The electronic device comprises memory circuitry.

The electronic device comprises interface circuitry. The electronic device comprises display circuitry. The electronic device comprises processor circuitry. The electronic device is configured to obtain combined environment data. The combined environment data is indicative of a combination of a first location and a second location. The combined environment data may comprise an avatar parameter indicative of a person in the second location. The electronic device may be configured to determine an activity parameter associated with the avatar parameter. The electronic device may be configured to obtain, based on the activity parameter, an updated avatar parameter indicative of the person in the second location. The electronic device is configured to display a second user interface object representative of the combined environment data and optionally a first user interface object representative of the updated avatar parameter.

Also disclosed is a method. The method can be performed by an electronic device. The method comprises obtaining combined environment data, wherein the combined environment data is indicative of a combination of a first location and a second location. The combined environment data can comprise an avatar parameter indicative of a person in the second location. The method can comprise determining an activity parameter associated with the avatar parameter. The method can comprise obtaining, based on the activity parameter, an updated avatar parameter indicative of the person in the second location. The method comprises displaying a first user interface object representative of an updated avatar parameter and a second user interface object representative of the combined environment data.

It is an advantage of the present disclosure that a combined environment can be displayed to represent a virtual combination of two or more different locations to enable virtual interaction between persons. The combined environment can be a virtual environment, accessible by a number of users. The combined environment can display locations and/or activities of avatars representative of persons within the combined environment with improved accuracy. This can allow for improved interactions to occur in a remote work setting, which may be timelier. The disclosed electronic device may be seen as supporting more efficiently a user in performing a technical task of initiating a communication and/or an interaction. Further, the disclosure may allow for more discussion as workers may have a more accurate information regarding a co-worker's context and availability.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
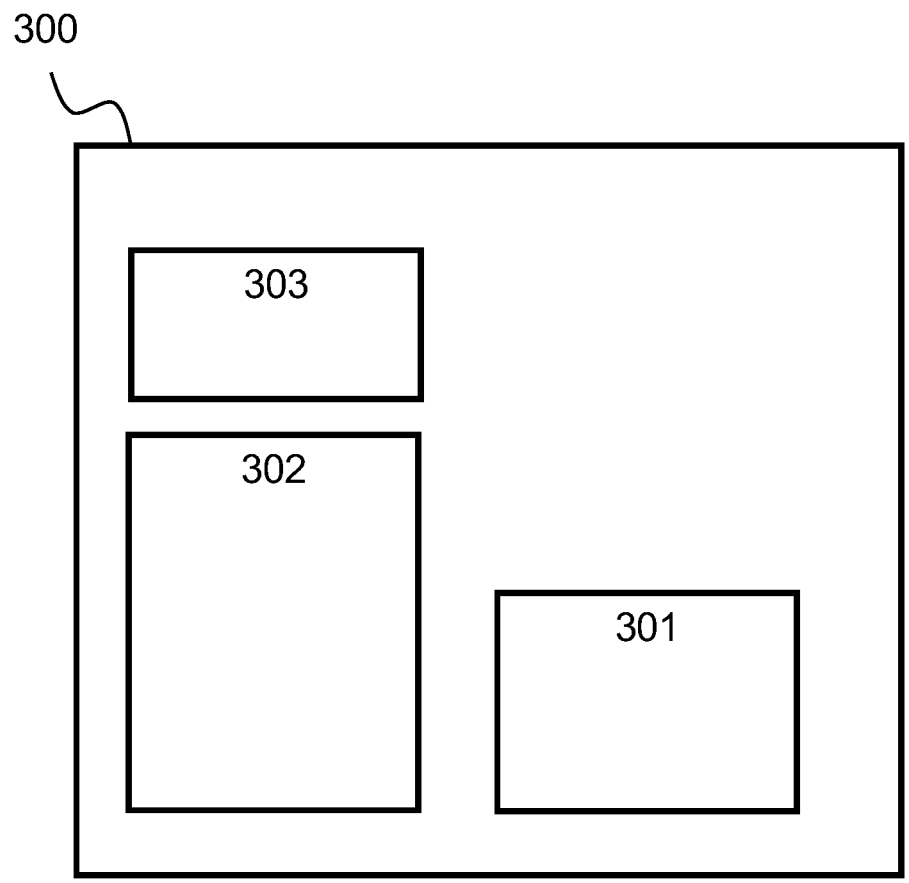
FIG. 1 is a block diagram illustrating an example server device according to the disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

Disclosed herein are devices, systems, assemblies, and/or methods for providing and/or using a combined environment from at least a first location and a second location. The combined environment may be a virtual combined environment. The combined environment may allow for a user to see where other persons, such as co-workers, staff, managers, bosses, and visitors, are located, and what they are doing, in a virtual environment.

An environment, such as a virtual environment, may be seen as a digital representation of a location, for example a digital representation of spaces and/or areas in a location. The environment can include data indicative of a location, for example data indicative of spaces and/or areas in a location.

The virtual combined environment can be particularly useful for remote working settings. A number of locations can be associated with the virtual combined environment in order to improve collaboration and communication.

The device(s) and method(s) disclosed herein can be configured to provide a more informed and/or nuanced view of person availability even in separate locations. The device(s) and method(s) disclosed herein can relate to virtual meeting systems. The device(s) and method(s) disclosed herein can relate to a merged home-office virtual environment.

The disclosure provides device(s) and/or method(s) for providing a combined environment, such as a combined virtual or physical environment, which in some examples can represent an office. Persons, such as co-workers, employees, employers, can associate and/or sync and/or merge and/or map their own workspace at home and other parts of the home to the combined environment data. For example, the persons can mirror locations in the virtual office environment of their home. The person can then be registered, such as via an avatar and/or an avatar parameter, using position and activity sensors when present in these spaces. A user device could display the avatar in the combined environment data.

The server device disclosed herein may be a physical server. The server device disclosed herein may be a virtual server. The server device disclosed herein may be a cloud server.

The electronic device disclosed herein can be one of many types of electronic devices. The electronic device can be a user device. The electronic device can be computer. The electronic device may be a tablet. The electronic device may be an application. The electronic device may be a mobile phone, such as a smart phone. The electronic device can be a device running a program. For example, the electronic device can be a phone running an application.

The electronic device and/or the server device can be part of a system and/or assembly of devices. The electronic device and/or the server device can be one or more server devices and/or one or more electronic devices. The electronic device and/or the server device can be configured to connect to one or more other electronic devices and/or other server devices. The electronic device can be configured to connect to a server. The electronic device and/or the server device can be configured to connect to an image sensor. The electronic device and/or the server device can be configured to connect to a user equipment. The connections can be wired and/or wireless connections.

The electronic device and/or the server device can be configured to provide and/or generate and/or display virtual environments. The electronic device and/or the server device can be configured to obtain and/or receive presence, location and activity sensing.

FIG. 1 shows a block diagram of an example server device 300 according to the disclosure. The server device 300 may be configured to generate a combined environment, such as combined environment data. The server device 300 may be configured to generate a virtual combined environment, such as virtual combined environment data.

The server device 300 comprises memory circuitry 301. The server device 300 comprises a processor circuitry 302. The server device 300 comprises an interface circuitry 303.

In one or more example server devices, the server device 300 is configured to provide a combined environment. In one or more example server devices, the server device 300 comprises memory circuitry 301. In one or more example server devices, the server device 300 comprises interface circuitry 303. In one or more example server devices, the server device 300 comprises processor circuitry 302. In one or more example server devices, the processor circuitry 302 can be configured to determine first parameters. In one or more example server devices, the first parameters can be indicative of a first location. In one or more example server devices, the processor circuitry 302 can be configured to determine, based on first data, first parameters indicative of a first location. In one or more example server devices, the processor circuitry 302 can be configured to generate first environment data. In one or more example server devices, the first environment data can be indicative of the first location. In one or more example server devices, the processor circuitry 302 can be configured to generate, based on the first parameters, first environment data indicative of the first location. In one or more example server devices, the processor circuitry 302 can be configured to determine second parameters. In one or more example server devices, the second parameters can be indicative of a second location. In one or more example server devices, the processor circuitry 302 can be configured to determine, based on second data, second parameters indicative of a second location. In one or more example server devices, the processor circuitry 302 can be configured to associate the second parameters with the first environment data. In one or more example server devices, the processor circuitry 302 is configured to associate second parameters with first environment data for providing combined environment data. The processor circuitry 302 is configured to output the combined environment data.

For example, the server device 300 may be configured to provide data representative of a combination of two or more locations, such as the first location and the second location. The server device 300 may be configured to provide a data representation of one of the locations, such as the first location, as a combined environment data and then associate and/or map and/or sync further locations, such as the second location, onto the combined environment data. The combined environment data can be indicative and/or representative of a combined environment. The combined environment data can be indicative of a combination of the first location and the second location.

In one or more example server devices, the processor circuitry 302 can be configured to determine, based on first data, first parameters indicative of a first location. The first parameters can be location parameters. The first parameters can be geometric parameters. The first parameters can be sensor parameters.

In one or more example server devices, the processor circuitry 302 can be configured to determine, based on first data, one or more first parameters indicative of a first location.

The first location may be a space, such as an area, location, indoor space, outdoor space, office, building, factory, facility, hospital, home, apartment, or house. The type of first location is not limiting.

The first data may be based on the first location. The first data may be sensor data. The first data may be image data. The first data may be input data. The first data may be user data. The first data may be representative of a portion of the first location. The first data may be a representative of an entirety of the first location. The first data may be representative of a layout of the first location. The first data may be a representative of a portion of a layout of the first location. The first data may be a representative of a full layout of the first location.

In one or more examples, the first data may comprise one or more of: sensor data, image data, input data, and user data.

The first data may be stored in a database. The first data may be provided to the server device. For example, the first data may be provided via the interface circuitry. The first data may be stored in the server device. For example, the first data may be stored in the memory circuitry.

The first parameters may be indicative of the first location. The first parameter may be seen as parameters indicative of a localization and/or a geometry and/or a layout associated with the first location. The first parameters may be indicative of one or more areas of the first location. The first parameters may be indicative of one or more spaces of the first location. The first parameters may be indicative of a layout of the first location. The first parameters may be indicative of a portion of a layout of the first location. The first parameters may be indicative of a portion of an entirety of a layout of the first location.

The first parameters may be indicative of one or more spaces and/or one or more areas of the first location.

The first parameters may be indicative of one or more of: one or more areas of the first location, one or more spaces of the first location, a layout of the first location, and an entirety of a layout of the first location.

In one or more example server devices, the processor circuitry 302 can be configured to generate, based on the first parameters, first environment data indicative of the first location.

The first environment data can be indicative of a portion or an entirety of a layout of the first location, such as spaces and/or areas in the first location. For example, the first environment data can be indicative of different rooms in the first location. If the first location is an office, the first environment data may be indicative of one or more of: an office, a canteen, a coffee area, bathroom, a lounge area, a social area, a meeting room, a conference room, and an elevator.

The first parameters and/or the first environment data may be a true representation of the first location. The first parameters and/or the first environment data may not be a true representation of the first location. For example, the first parameters and/or the first environment data may designate certain spaces and/or areas in a different organization, size, position than what is in the first location.

In one or more example server devices, the processor circuitry 302 can be configured to determine, based on second data, second parameters indicative of a second location. The second parameters can be location parameters. The second parameters can be geometric parameters. The second parameters can be sensor parameters.

In one or more example server devices, the processor circuitry 302 can be configured to determine, based on second data, one or more second parameters indicative of a second location.

The second location may be a space, such as an area, location, indoor space, outdoor space, office, building, factory, facility, hospital, home, apartment, or house. The type of second location is not limiting.

The second location can be different from the first location. The second location can be physically separated from the first location. The first location can be independent of the second location.

The second data may be based on the second location. The second data may be sensor data. The second data may be image data. The second data may be input data. The second data may be user data. The second data may be representative of a portion of the second location. The second data may be a representative of an entirety of the second location. The second data may be representative of a layout of the second location. The second data may be a representative of a portion of a layout of the second location. The second data may be a representative of a full layout of the second location.

In one or more examples, the second data may comprise one or more of: sensor data, image data, input data, and user data.

The second data may be stored in a database. The second data may be provided to the server device. For example, the second data may be provided via the interface circuitry. The second data may be stored in the server device. For example, the second data may be stored in the memory circuitry.

The second parameters may be indicative of the second location. The second parameter may be seen as parameters indicative of a localization and/or a geometry and/or a layout associated with the second location. The second parameters may be indicative of one or more areas of the second location. The second parameters may be indicative of one or more spaces of the second location. The second parameters may be indicative of a layout of the second location. The second parameters may be indicative of a portion of a layout of the second location. The second parameters may be indicative of an entirety of a layout of the second location. The second parameters may be indicative of one or more spaces and/or one or more areas of the second location. The second parameters can be indicative of a portion or an entirety of a layout of the second location, such as spaces and/or areas in the second location. For example, the second parameters can be indicative of different rooms in the second location. If the first location is a home and/or apartment, the second parameters may be indicative of one or more of: a working area, a kitchen, a bathroom, a bedroom, and a living room.

The processor circuitry 302 can be configured to associate the second parameters with the first environment data for providing combined environment data. One or more second parameters can be associated with the first environment data. The processor circuitry 302 can be configured to map the second parameters onto the first environment data for providing combined environment data. The processor circuitry 302 can be configured to merge the second parameters onto the first environment data for providing combined environment data. The processor circuitry 302 can be configured to synchronize the second parameters onto the first environment data for providing combined environment data.

The processor circuitry 302 may be configured to associate the second parameters with the first environment data based on user, such as person, input. For example, the server device 300 can be configured to receive user input, such as user selections and/or user data, that selects a room in the second location to be associated with a particular area, parameter, data of the first environment data. As an example, the server device 300 can receive user input that the kitchen in the second location should be associated with a coffee break room of the first environment data. The server device 300 can then be configured to associate the second parameters indicative of the kitchen with the first environment data indicative of the coffee break room.

In one or more example server devices, the combined environment data comprises one or more first areas indicative of areas of the first location. The one or more first areas can be one or more of first spaces, first areas, and first rooms. The one or more first areas can be designated by a user. The one or more first areas can be determined using a machine learning scheme or an artificial intelligence. The one or more first areas can be detected using a machine learning scheme, such as by applying a clustering algorithm, such as density-based spatial clustering of applications with noise (DBSCAN) on the first location.

In one or more example server devices, the second parameters comprise one or more second areas. The second areas can be indicative of areas of the second location. In one or more example server devices, the processor circuitry 302 is configured to associate each of the one or more second areas with one of the one or more first areas.

The one or more second areas can be one or more of second spaces, second areas, and second rooms. The one or more second areas can be designated by a user. The one or more second areas can be determined using a machine learning scheme or an artificial intelligence. The one or more second areas can be detected using a machine learning scheme, such as by applying a clustering algorithm, such as density-based spatial clustering of applications with noise (DBSCAN) on the second location.

In one or more example server devices, the first location can be an office and the second location can be a home. The first environment data can be indicative of different spaces in an office. For example, the first environment data and/or the first parameters and/or the one or more first areas can be representative of a first office room, a second office room, and a break room.

As an example, the second parameters and/or the one or more second areas can be indicative of different spaces in a home, such as for a home office. The second parameters and/or the one or more second areas can then be associated with the first environment data. For example, the processor circuitry 302 can be configured to associate a second parameter and/or one of the one or more second areas indicative of a working space in the home to the first office room of the first environment data. The processor circuitry 302 can be configured to associate a second parameter and/or one of the one or more second areas indicative of a kitchen to the break room of the first environment data.

The association can be performed automatically. The association can be performed manually. For example, a user can provide information to the server device 300 about which rooms and/or areas to associate from the second location onto first environment data, indicative of the first location.

The combined environment data can be representative of a combination of the first location and the second location. The combined environment data can be representative of locations of the second location mapped onto locations of the first location.

The processor circuitry 302 is configured to output the combined environment data. The processor circuitry 302 can be configured to output the combined environment data to an external electronic device, for example wirelessly or via wired link. The processor circuitry 302 can be configured to output the combined environment data to another server device or an electronic device that may act as a user device. The processor circuitry 302 can be configured to output the combined environment data to a user device. The processor circuitry 302 can be configured to output the combined environment data to a database.

In one or more example server devices, the processor circuitry 302 can be configured to determine third parameters indicative of a third location. In one or more example server devices, the processor circuitry 302 can be configured to determine, based on third data, third parameters indicative of a third location. The processor circuitry 302 can be configured to associate the third parameters with the combined environment data. The third parameters can be location parameters. The third parameters can be geometric parameters. The third parameters can be sensor parameters.

The third location may be a space, such as an area, location, indoor space, outdoor space, office, building, factory, facility, hospital, home, apartment, or house. The type of third location is not limiting.

The third location can be different from the first location and/or the second location. The third location can be physically separated from the first location and/or the second location. The third location can be independent of the second location and/or the first location.

The third data may be based on the third location. The third data may be sensor data. The third data may be image data. The third data may be input data. The third data may be user data. The third data may be representative of a portion of the third location. The third data may be a representative of an entirety of the third location. The third data may be representative and/or indicative of a layout of the third location. The third data may be a representative of a portion of a layout of the third location. The third data may be a representative of a full layout of the third location.

In one or more examples, the third data may comprise one or more of: sensor data, image data, input data, and user data. The third data may be representative of one or more of: a portion of the third location, an entirety of the third location, a layout of the third location, a portion of a layout of the third location, and a full layout of the third location.

The third data may be stored in a database. The third data may be provided to the server device. For example, the third data may be provided via the interface circuitry. The third data may be stored in the server device. For example, the third data may be stored in the memory circuitry.

The third parameters may be indicative of the third location. The third parameters may be indicative of one or more areas of the third location. The third parameters may be indicative of one or more spaces of the third location. The third parameters may be indicative of a layout of the third location. The third parameters may be indicative of a portion of a layout of the third location. The third parameters may be indicative of a portion of an entirety of a layout of the third location. The third parameters may be indicative of one or more spaces and/or one or more areas of the third location.

The third parameters can be indicative of a portion or an entirety of a layout of the third location, such as spaces and/or areas in the third location. For example, the third parameters can be indicative of different rooms in the third location. If the third location is a home and/or apartment, the third parameters may be indicative of one or more of: a working area, a kitchen, a bathroom, a bedroom, and a living room.

In one or more example server devices, the third parameters comprise one or more third areas. The third areas can be indicative of areas of the third location. In one or more example server devices, the processor circuitry 302 is configured to associate each of the one or more third areas with one of the one or more first areas.

The one or more third areas can be one or more of third spaces, third areas, and third rooms. The one or more third areas can be designated by a user. The one or more third areas can be designated by an artificial intelligence.

In one or more example server devices, the first location can be an office and the second location can be a home and the third location can be an apartment. In one or more example server devices, the first location can be a first office location and the second location can be a second office location and the third location can be a third office location.

The first environment data and/or the combined environment data can be indicative of a first location. The first environment data and/or the combined environment data can be indicative of different spaces in an office. For example, the first environment data and/or the combined environment data and/or the first parameters and/or the one or more first areas can be representative of a first office room, a second office room, and a break room.

As an example, the second parameters and/or the one or more second areas can be indicative of different spaces in a home, such as for a home office. The second parameters and/or the one or more second areas can then be associated with the first environment data. For example, the processor circuitry 302 can be configured to associate a second parameter and/or one of the one or more second areas indicative of a working space in the home to the first office room of the first environment data. The processor circuitry 302 can be configured to associate a second parameter and/or one of the one or more second areas indicative of a kitchen to the break room of the first environment data.

As an example, the third parameters and/or the one or more third areas can be indicative of different spaces in an apartment, such as for a remote office. The third parameters and/or the one or more third areas can then be associated with the first environment data and/or the combined environment data. For example, the processor circuitry 302 can be configured to associate a third parameter and/or one of the one or more third areas indicative of a working space in the apartment to the second office room of the first environment data and/or the combined environment data. The processor circuitry 302 can be configured to associate a third parameter and/or one of the one or more third areas indicative of a kitchen to the break room of the first environment data and/or the combined environment data.

Areas and/or parameters from multiple locations can be associated with a same area of the first environment data and/or the combined environment data. A kitchen of the second location and a kitchen of the third location can both be associated with a break room of the first environment data and/or the combined environment data.

The association can be performed automatically. The association can be performed manually. For example, a user can enter information about which rooms to associate from the second location onto the first location.

The combined environment data can be representative of a combination of the first location and the second location. The combined environment data can be representative of locations and/or areas and/or spaces of the second location mapped onto locations of the first location. The combined environment data can be representative of one or more of: locations, areas, and spaces of the second location mapped onto locations of the first location. The combined environment data can be representative of a combination of the first location, the second location, and the third location. The combined environment data can be representative of locations and/or areas and/or spaces of the second location mapped and locations of the third location mapped onto locations and/or areas and/or spaces of the first location.

Further parameters indicative of further locations based on further data can be determined as well. For example, fourth parameters indicative of a fourth location based on fourth data can be determined. The particular number is not limiting, and fifth, sixth, seventh, or more data, parameters and locations can be used by the server device 300.

In one or more example server devices, the server device 300 is configured to obtain the first data. In one or more example server devices, the server device 300 is configured to obtain the second data. In one or more example server devices, the server device 300 is configured to obtain the first data and/or the second data. In one or more example server devices, the server device 300 is configured to obtain the third data. In one or more example server devices, the server device 300 is configured to obtain the first data and/or the second data and/or the third data.

In one or more example server devices, the server device 300 can be configured to obtain the first data, the second data, and/or the third data at initialization. In one or more example server devices, the server device 300 can be configured to obtain the first data, the second data, and/or the third data based on a configuration or settings associated with the first location, the second location, and/or the third location. In one or more example server devices, the server device 300 can be configured to obtain the first data, the second data, and/or the third data based on user input indicating the configuration. In one or more example server devices, the server device 300 can be configured to obtain the first data, the second data, and/or the third data based on detecting sensors. In one or more example server devices, the server device 300 can be configured to obtain the first data, the second data, and/or the third data based on calibration. In one or more example server devices, the server device 300 can obtain the first data, the second data, and/or the third data via artificial intelligence. In one or more example server devices, the server device 300 can obtain the first data, the second data, and/or the third data via machine learning. In one or more example server devices, the server device 300 can be configured to obtain the first data, the second data, and/or the third data based on clustering, such as identifying areas of most occupancy and/or activity.

In one or more example server devices, the server device 300 can be configured to obtain the first data, the second data, and/or the third data at one or more of initialization, configurations or settings associated with the first location, the second location, and/or the third location, user input, detecting sensors, calibration, artificial intelligence, machine learning, and clustering.

The server device 300 can be configured to obtain the first data, the second data, and/or the third data via a wired connection. The server device 300 can be configured to obtain the first data, the second data, and/or the third data wirelessly. The server device 300 can be configured to obtain the first data, the second data, and the third data in the same manner. The server device 300 can be configured to obtain the first data, the second data, and the third data in different manners. The server device 300 can be configured to obtain the first data, the second data, and/or the third data via one or more of: a wired connection and a wireless connection.

The server device 300 can be configured to obtain one or more of the first data, the second data, and the third data from a database. The server device 300 can be configured to obtain one or more of the first data, the second data, and the third data from a user device. The server device 300 can be configured to obtain one or more of the first data, the second data, and the third data from a sensor. The server device 300 can be configured to obtain one or more of the first data, the second data, and the third data from an image sensor. The server device 300 can be configured to obtain one or more of the first data, the second data, and the third data from a server. The server device 300 can be configured to obtain one or more of the first data, the second data, and the third data from a user.

The server device 300 can be configured to obtain one or more of the first data, the second data, and the third data from one or more of: a database, a user device, a sensor, an image sensor, a server, and a user.

The server device 300 can be configured to obtain one or more of the first data, the second data, and the third data manually. The server device 300 can obtain one or more of the first data, the second data, and the third data automatically.

In one or more example server devices, the processor circuitry 302 is configured to generate, based on sensor data, an avatar parameter indicative of a person in the second location or in the first location. In one or more example server devices, the processor circuitry 302 is configured to generate an avatar parameter. The generation can be based on sensor data. The avatar parameter can be indicative of a person in the second location. The avatar parameter can be indicative of a person in the first location. In one or more example server devices, the processor circuitry 302 is configured associate the avatar parameter with the combined environment data. The combined environment data can be updated with the avatar parameter. The combined environment data can be modified with the avatar parameter. The avatar parameter may be seen as a parameter indicative of a person, for example, so that an avatar user interface object may be displayed on an electronic device based on the avatar parameter.

The avatar parameter may be indicative of a person. The avatar parameter may be representative of a person. The avatar parameter may be indicative of a status of a person. The avatar parameter may be indicative of a location of a person. The avatar parameter may be indicative of a position of a person. The avatar parameter may be indicative of a position of a person within the first location or the second location. The avatar parameter may be indicative of an avatar.

In one or more example server devices, the sensor data comprises positional sensor data and/or image sensor data and/or activity sensor data. In one or more example server devices, the sensor data comprises positional sensor data. In one or more example server devices, the sensor data comprises image sensor data. The sensor data may comprise pose, or posing, data. In one or more example server devices, the sensor data comprises activity sensor data. In one or more example server devices, the avatar parameter comprises an activity parameter based on the sensor data.

In one or more example server devices, the server device 300 can be configured to determine an activity parameter. The activity parameter can be indicative of an activity of a person. For example, the activity may include one or more of: a movement, a position, an action (such as drinking, talking, discussing, typing, sleeping, resting, and/or having a telephone conversation, and/or a teleconference). The activity parameter can be indicative of a position of the person. The activity parameter can be indicative of a location of the person. The activity parameter can be indicative of a movement of the person. The server device 300 can be configured to provide a notification based on the activity parameter.

The processor circuitry 302 can be configured to compare an activity parameter of a user with an activity parameter of another user. The processor circuitry 302 may be configured to generate a notification in accordance with the determination that the activity parameter of the user is the same as the active parameter of the another user. The processor circuitry 302 may be configured to not generate a notification in accordance with the determination that the activity parameter of the user is not the same as the active parameter of the another user.

It can be advantageous to assess another person's, such as a coworker's, availability through situation and/or contextual assessment. For example, when the co-worker is engaged in a discussion or deeply focused on a task, a person may choose to approach the co-worker at a later time. In a virtual, or remote, work environment, these social cues can be lost, and it becomes difficult to assess when a co-worker might be available. Although applications such as social network messengers provide availability status by displaying available or busy, this status is less accurate and much less fine grained and does not provide any cue on when the co-worker might respond. Additionally, the status is not always kept up-to-date and does therefore not reflect the current availability. As an example, if a meeting ends earlier the co-worker may forget to update the status to available.

In one or more example server devices, the server device can be configured to determine and/or provide information of a person's availability and response time. Further, the server device(s) can be configured to determine and/or provide a context parameter indicative of an availability, and/or availability context and/or an expectation of when to receive a response. Moreover, the server device(s) can be configured to determine and/or provide a status parameter indicative of confidential matters. In one or more examples, the activity parameter may comprise or may be based on the context parameter.

In one or more example server devices, the server device 300 can be configured to determine an availability parameter. The availability parameter can provide a context-based availability status. The availability parameter may be seen as a parameter indicative of the availability of a person, for example based on contextual data. The availability parameter may be indicative of an engagement level of a person, for example how engaged a person is in an activity, such as talking on the phone. In one or more examples, the context parameter may comprise or may be based on the availability parameter. In one or more example server devices, the context parameter can be independent from the activity parameter and/or the availability parameter.

In one or more example server devices, the availability parameter can be independent from the activity parameter. In one or more example server devices, the activity parameter may include and/or comprise and/or based on an availability parameter.

The availability parameter can be indicative of an availability of a person. For example, the availability parameter can be indicative of an availability of a person in accordance with the person one or more of: not being in a meeting, not being on a call, not being on a videoconference, not having a gaze direction at a screen, and not actively working.

The availability parameter can be indicative of a non-availability of a person. For example, the availability parameter can be indicative of a non-availability of a person in accordance with the person one or more of: being in a meeting, being on a call, being on a videoconference, having a gaze direction at a screen, and actively working.

In one or more example electronic device, the processor circuitry 302 can be configured to determine a gaze time and/or a gaze direction of a person, for example based on sensor data obtained. In one or more example electronic device, the processor circuitry 302 can be configured to determine a gaze time and/or a gaze direction of a person from one or more frames of a video sensor data and/or an image sensor data. In one or more example electronic device, the processor circuitry 302 can be configured to determine whether the gaze time and/or gaze direction of the person is at a screen associated with work.

The processor circuitry 302 can be configured to determine an availability parameter indicative of availability of the person in accordance with the person not looking at the screen based on the gaze direction for a gaze time. The processor circuitry 302 can be configured to determine an availability parameter indicative of a non-availability of the person in accordance with the person looking at the screen based on the gaze direction for a gaze time.

The gaze time can be set by the person. The gaze time can be pre-determined. The gaze time can be 1, 2, 3, 4, 5, or 10 minutes. The processor circuitry 302 can be configured to allow for the person's gaze to look away from the screen for a look away time during the gaze time. The look-away time can be 10, 20, 30, 40, 50, or 60 seconds. The look-away time can be 1, 2, 3, 4, or minutes.

For example, a person may be working and have a gaze direction at a screen, and the gaze time may be set at 10 minutes. The person may look away multiple times for a duration that is below a threshold, such for 30 seconds maximum. For example, once a time of 10 minutes has been reached, the processor circuitry 302 can determine an availability parameter indicative of a non-availability of the person.

In an example, the processor circuitry 302 can be configured to determine an availability parameter indicative of a non-availability of a person in accordance with a person being on a phone call. In an example, the processor circuitry 302 can be configured to determine an availability parameter indicative of an availability of a person in accordance with a person not being on a phone call.

In one or more example server devices, the processor circuitry 302 can be configured to receive input from the person and may be configured to determine an availability parameter indictive of an availability of the person or an availability parameter indictive of a non-availability of the person. For example, a person can set a status as busy, and the processor circuitry 302 can be configured to determine an availability parameter indictive of a non-availability of the person in accordance with a determination that the status has been set as busy. A person can set a status as available, and the processor circuitry 302 can be configured to determine an availability parameter indictive of an availability of the person in accordance with a determination that the status has been set as available.

As an example, a person in the second location may be using a videoconferencing application. The processor circuitry 302 can be configured to determine that the person is in a meeting. The processor circuitry 302 can determine an availability parameter indictive of a non-availability of the person as the person is in the meeting. The processor circuitry 302 can determine an availability parameter indictive of an availability of the person in accordance with the meeting ending, such as a calendar meeting ending or the videoconferencing application closing.

As an example, a person in the second location may be typing on an email application. The processor circuitry 302 can determine an availability parameter indictive of a non-availability of the person in accordance with the person typing. The processor circuitry 302 can determine an availability parameter indictive of an availability of the person in accordance with the person stopping typing, such as for a pause time. The pause time may be a time period that the person is not typing, such as 10, 20, 30, 40, 50, or 60 seconds.

As an example, a person in the second location may be reading an article. The processor circuitry 302 can determine an availability parameter indictive of a non-availability of the person in accordance with the determination that the gaze direction is at a screen associated with a work environment for a gaze time. The processor circuitry 302 can determine an availability parameter indictive of an availability of the person in accordance with determining that the gaze direction is not at a screen associated with a work environment for a gaze time.

The processor circuitry 302 can be configured to determine an availability parameter based on a model, such as a regression model. The processor circuitry 302 can be configured to predict and/or forecast an availability parameter.

The availability parameter indicative of a non-availability of the person may be associated with a response parameter. The response parameter can be indicative of a time period in which the person will respond when the processor circuitry 302 determines an availability parameter indictive of a non-availability of the person. The processor circuitry 302 can be configured to receive user input to set the response parameter. The response parameter can be pre-determined. The processor circuitry 302 can be configured to output the response parameter.

The processor circuitry 302 can be configured to determine a response parameter based on a model, such as a regression model. The processor circuitry 302 can be configured to predict and/or forecast a response parameter.

The processor circuitry 302 can be configured to determine a privacy status, or confidentiality status, associated with an availability parameter in. The privacy status may be indicative of the person being in a room with other people. The privacy status may be indicative of the person being in a room with other people not found in a database. The database can be set with a number of people who have access to confidential information.

For example, the processor circuitry 302 can be configured to determine a privacy status associated with an availability parameter indicative of a non-availability of a person. The processor circuitry 302 can be configured to determine a privacy status associated with an availability parameter indicative of an availability of a person.

As an example, a person in the second location may be in a busy area. The processor circuitry 302 can determine an availability parameter indictive of a non-availability of the person in accordance with the determination that the person is speaking and/or another person in the second location is speaking, such as via sensor data a microphone. The processor circuitry 302 can determine an availability parameter indictive of an availability of the person in accordance with determining that the person and the another person are not speaking. In accordance with a determination that the another person is not within database, the processor circuitry 302 can be configured to generate a privacy status associated with the availability parameter indictive of a non-availability of the person.

In one or more example server devices, the processor circuitry 302 may be configured to block communication, such as a chat message and/or call, to a person in accordance with a determination of an availability parameter indictive of a non-availability of the person. In one or more example server devices, the processor circuitry 302 may be configured to allow communication to a person in accordance with a determination of an availability parameter indictive of an availability of the person.

In one or more example server devices, the processor circuitry 302 may be configured to output a request type notification, such as a request for a text message, audio call, or video call, indicative of a request being made to a person in accordance with a determination of an availability parameter indictive of a non-availability of the person. The processor circuitry 302 can be configured to receive input from the person on proceeding with the request or not. The processor circuitry 302 can be configured to calculate and/or store and/or output a response parameter based on the received input from the person. The processor circuitry 302 can be configured to update and/or train a model (such as a regression machine-learning model) based on the received input from the person. For example, the model can predict a response for a request based on the availability parameter (such as indicative of engagement of the user) and/or a request type. The processor circuitry 302 can be configured to use an updated model on following operations. In one or more exemplary server devices, the input to and prediction from the model could be the response time, such as the response parameter. Other types of temporal indicator could additionally work if using a classification model, such as a textual notice of: "in a second", "shortly", "later", "never").

For example, a person may be on a videoconference. The processor circuitry 302 can determine an availability parameter indicative of a non-availability of the person. Another person may try to call the person on the videoconference. The processor circuitry 302 can output a request type notification to the person on the videoconference that a call is being made. The person can provide input to the processor circuitry 302 to ignore the call. The processor circuitry 302 can output a response parameter to the person calling.

The sensor data can be obtained by one or more sensors that may be placed at the first location, and/or the second location and/or the third location. The sensor data can be obtained from an image sensor. The sensor data can be from an optical sensor. The sensor data can be from a location sensor. The sensor data can be from an activity sensor. The sensor data can be from an Bluetooth low energy sensor. The sensor data can be from an ultra-wideband sensor. The sensor may be from a vision sensor. The sensor data may be from a light detection and ranging (LIDAR) sensor. The sensor data may be from a pose detection sensor. The sensor data may be obtained from one or more of: a person's mobile phone, a person's computer, a person's tablet, and a person's laptop. For example, the sensor data may be obtained from a microphone and/or camera on a person's mobile phone. The sensor data may be obtained from a microphone and/or camera in a first location and/or a second location.

In one or more examples, the one or more sensors may be one or more of: an image sensor, an optical sensor, a location sensor, an activity sensor, a presence sensor, a motion sensor, a microphone, a Bluetooth low energy sensor, an ultra-wideband sensor, a vision sensor, a LIDAR sensor and a pose detection sensor.

The sensor data may comprise audio data. The sensor data may comprise video data. The sensor data may be location, such as positioning, data. The sensor data may comprise one or more of: audio data, location data, and video data. The sensor data may be received from one or more of: a handset, laptop, camera, and phone. The sensor data may be received by a handset. The sensor data may be received by a laptop. The sensor data may be received by a camera. The sensor data may be received by a phone. The particular sensor is not limiting. The server device 300 can be configured to generate sensor data.

The sensor data can be obtained continuously. The sensor data can be obtained in real-time. The sensor data can be obtained intermittently and/or in intervals. The sensor data may be obtained when a person is using a particular electronic device and/or application.

In one or more examples, sensor data may only be obtained in certain areas of the first location and/or the second location. The sensor data may only cover areas as requested by a user. The one or more sensors may be set up in certain areas of the first location and/or the second location.

In one or more examples, sensor data may only be obtained during certain times of day. For example, the sensor data may only be obtained during work hours.

The one or more sensors can obtain sensor data indicative of a person within the first location and/or the second location. The processor circuitry 302 can be configured to generate the avatar parameter based on the sensor data. The processor circuitry 302 can be configured to associate the avatar parameter with the combined environment data. For example, the avatar parameter can be associated with a particular location of the combined environment data.

As an example, the combined environment data can be representative of a home associated with an office, such as including one or more of: a first office room, a second office room, and a breakroom, and the person is located in the home. The combine environment data can be representative of a first office room. The combine environment data can be representative of a second office room. The combine environment data can be representative of a breakroom. The combine environment data can be representative of a person located in the home.

The home can include a working location which has been associated to the first office room and a kitchen associated with the breakroom. The sensor can obtain sensor data indicative of a location of the person in the home. If the person is in the working location, the processor circuitry 302 can be configured to associate an avatar parameter with the first office room of the combined environment data. If the person moves to the kitchen, the processor circuitry 302 can be configured to associate the avatar parameter with the break room of the combined environment data.

In one or more example server devices, the processor circuitry 302 is configured to generate, based on second sensor data, a second avatar parameter indicative of a second person in the third location. In one or more example server devices, the processor circuitry 302 is configured to generate a second avatar parameter. The generation can be based on second sensor data. The second avatar parameter can be indicative of a second person in the second location. The second avatar parameter can be indicative of a person in the first location. The second avatar parameter can be indicative of a person in the third location. In one or more example server devices, the processor circuitry 302 is configured associate the second avatar parameter with the combined environment data. The combined environment can be updated with the second avatar parameter.

The second avatar parameter may be indicative of a second person. The second avatar parameter may be representative of a second person. The second avatar parameter may be indicative of a location of a second person. The second avatar parameter may be indicative of a position of a second person. The second avatar parameter may be indicative of a position of a second person within the first location, the second location, or the third location.

In one or more example server devices, the second sensor data comprises positional sensor data and/or image sensor data and/or activity sensor data. In one or more example server devices, the second sensor data comprises positional sensor data. In one or more example server devices, the second sensor data comprises image sensor data. In one or more example server devices, the second sensor data comprises activity sensor data.

The second sensor data can be obtained by one or more sensors. The second sensor data can be from an image sensor. The second sensor data can be from an optical sensor. The second sensor data can be from a location sensor. The second sensor data can be from an activity sensor. The second sensor data can be obtained by one or more of: an image sensor, an optical sensor, a location sensor, and an activity sensor. The particular sensor is not limiting. The second sensor data can be obtained continuously.

The second sensor data can be obtained in real-time.

The processor circuitry 302 can be configured to generate as many avatar parameters as desired. For example, the processor circuitry 302 can be configured to generate 1, 2, 3, 4, 5, 6, 7, 8, 9, or 10 avatar parameters. The processor circuitry 302 can be configured to generate greater than 1, 2, 3, 4, 5, 6, 7, 8, 9, or 10 avatar parameters. Each of the avatar parameters can be indicative of a particular person in a particular location. Some locations, for example the first location, may include multiple avatar parameters. The number of avatar parameters per location is not limiting.

In one or more example server devices, the first location may be indicative of an office. Parameters indicative of a second location, a third location, a fourth location, and a fifth location may be associated with first environment data indicative of the first location (the office) and/or the combined environment data for providing and/or updating the combined environment data. Thus, avatars from all of the locations can be associated with the combined environment data, such as positional data for each of the avatars. The combined environment data can indicate where in the first location that each of the avatars would be located in.

The processor circuitry 302 could be configured to output the combined environment data, including all of the associated avatar parameters, for example to a user device, such as the electronic device disclosed herein. A user device could display a basic layout of an office, as well as the representative location of avatars in the office, even though they all may be in separate locations. Thus, a user could see if the avatars were in their office, and would understand that they were working. A user could see that one or more avatars are in the break room, and could feel comfortable contacting that avatar without feeling that they are interrupting work.

In one or more example server devices, the processor circuitry 302 is configured to determine a distance parameter. The distance parameter can be indicative of a distance between the avatar parameter and the second avatar parameter in the combined environment data.

The distance parameter can be indicative of a distance between locations of the avatar parameter and the second avatar parameter, and/or the person and the second person. The processor circuitry 302 can be configured to compare the distance parameter with a threshold. The distance can be a physical distance. The distance can be a virtual distance. The processor circuitry 302 can be configured to determine whether the distance parameter is below a threshold. The processor circuitry 302 can be configured to determine whether the distance parameter is not below a threshold. In one or more example server devices, the threshold can be based on the activity parameter. In one or more example server devices, the threshold can be modified based on the activity parameter.

The processor circuitry 302 can be configured to generate a proximity indicator in accordance with the distance parameter being below a threshold. The processor circuitry 302 can be configured to not generate a proximity indicator in accordance with the distance parameter being not below a threshold. An indicator may be a prompt or notification. The proximity indicator may be indicative of a proximity and/or location of the avatar parameter and the second avatar parameter. In one or more example server devices, the distance parameter can be based on the activity parameter. In one or more example server devices, the distance parameter can be modified based on the activity parameter.

The threshold can be an area of the combined environment data. For example, if the avatar parameter and the second avatar parameter were in the same area of the combined environment data, the distance between locations of the avatar parameter and the second avatar parameter may be below the threshold. A proximity indicator can be generated indicative that the avatar parameter and the second avatar parameter were in the same area of the combined environment data. A proximity indicator can be generated indicative that the avatar parameter and the second avatar parameter were in the same area of the combined environment data in accordance with the distance parameter being below the threshold. If the avatar parameter and the second avatar parameter were in different areas of the combined environment, no proximity indicator may be generated. A proximity indicator may not be generated indicative that the avatar parameter and the second avatar parameter were in different areas of the combined environment data in accordance with the distance parameter being not below the threshold. The proximity indicator may be output. The proximity indicator may be part of the combined environment data.

As an example, if the avatar parameter was in the coffee break room of the combined environment data, the person associated with the avatar parameter may receive a proximity indicator, such as from server device 300, when the second avatar parameter also transitions, such as moves, to the coffee break room of the combined environment data.

The processor circuitry 302 is configured to generate a communication parameter. The communication parameter can be indicative of a communication between the avatar parameter and the second avatar parameter. The communication parameter may be indicative of a prompt. The communication parameter may be configured to cause a user device to display the prompt.

For example, if the person represented by the avatar parameter and the person represented by the second avatar parameter were communicating, such as via a phone call, a video chat, etc., the communication parameter may be generated. Therefore, a third person may see the communication parameter and know not to try to communication with the person or the second person. The server device 300 may be configured to block other users from communication with the persons having the communication parameter if a communication parameter is found.

The processor circuitry 302 can be configured to generate a movement indicator and/or prompt and/or notification whenever an avatar parameter moves areas in the combined environment data. The movement indicator may be representative of a change of area of an avatar parameter.

As an example, the server device 300 may be configured to generate a combined environment of a physical office space. The physical office space, such as the first location, may be installed with one or more presence and/or activity sensors. The server device 100 may be configured to associate and/or map the physical office space to a virtual office space. The physical home environment, such as the second location, of each employee, such as each person, can have appropriate areas installed with one or more presence and/or activity sensors. The appropriate home areas can be associated and/or mapped to appropriate virtual office areas, such as of the combined environment data.

The one or more sensors in the physical home environment, such as the second location, and the office environment, such as the first location can register presence and/or activity of the person or persons. The associated with and/or mapped area in the combined environment can be populated with specific persons avatar, such as using one or more avatar parameters. If an activity of a person is registered, the avatar can perform the activity. All users can access the combined environment to see where others are and what they are doing.

Figure 2A:
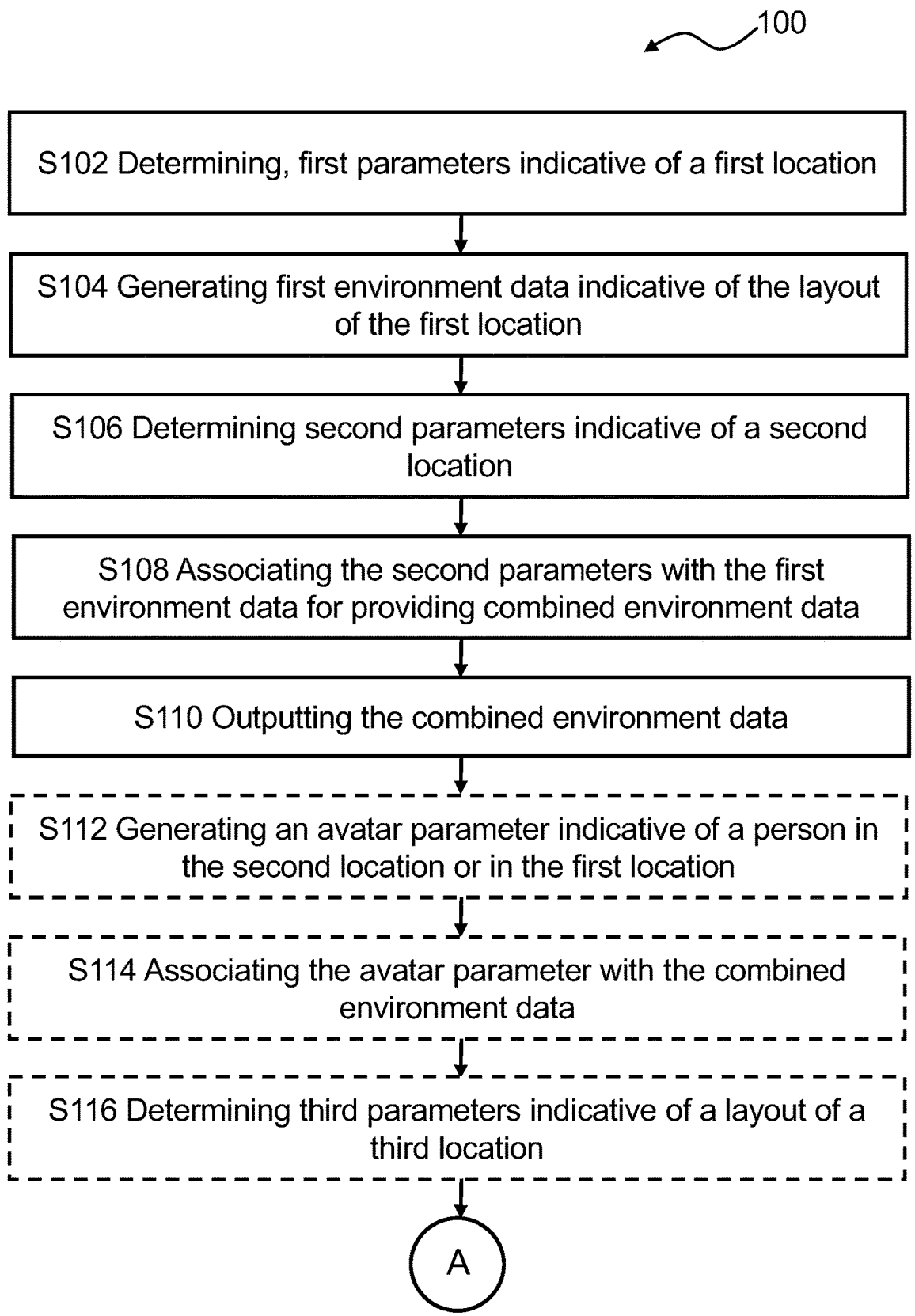
FIGS. 2A-2C are flow-charts illustrating an example method, performed in a server device, for providing a combined environment according to this disclosure.
Figure 2B:
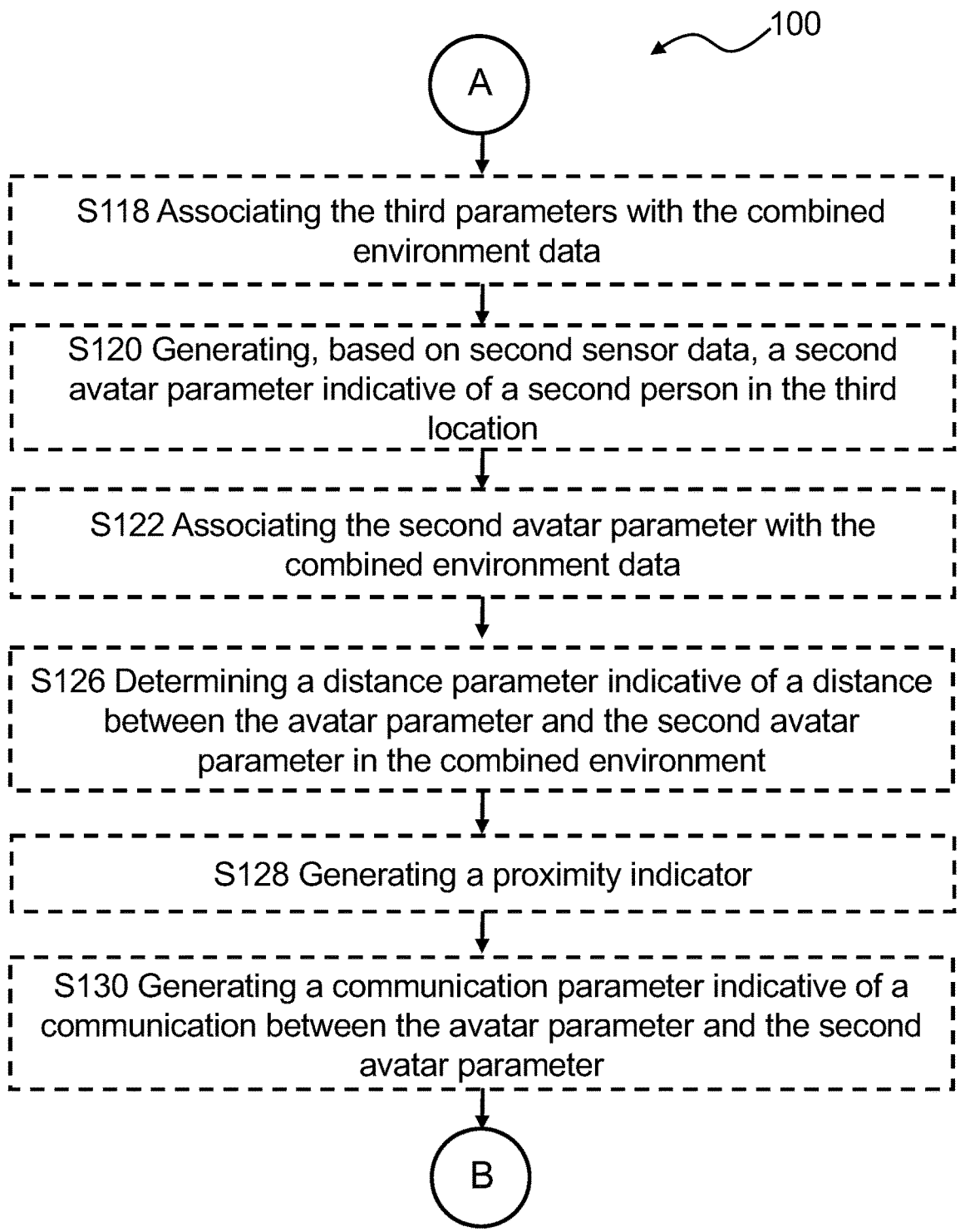
Figure 2C:
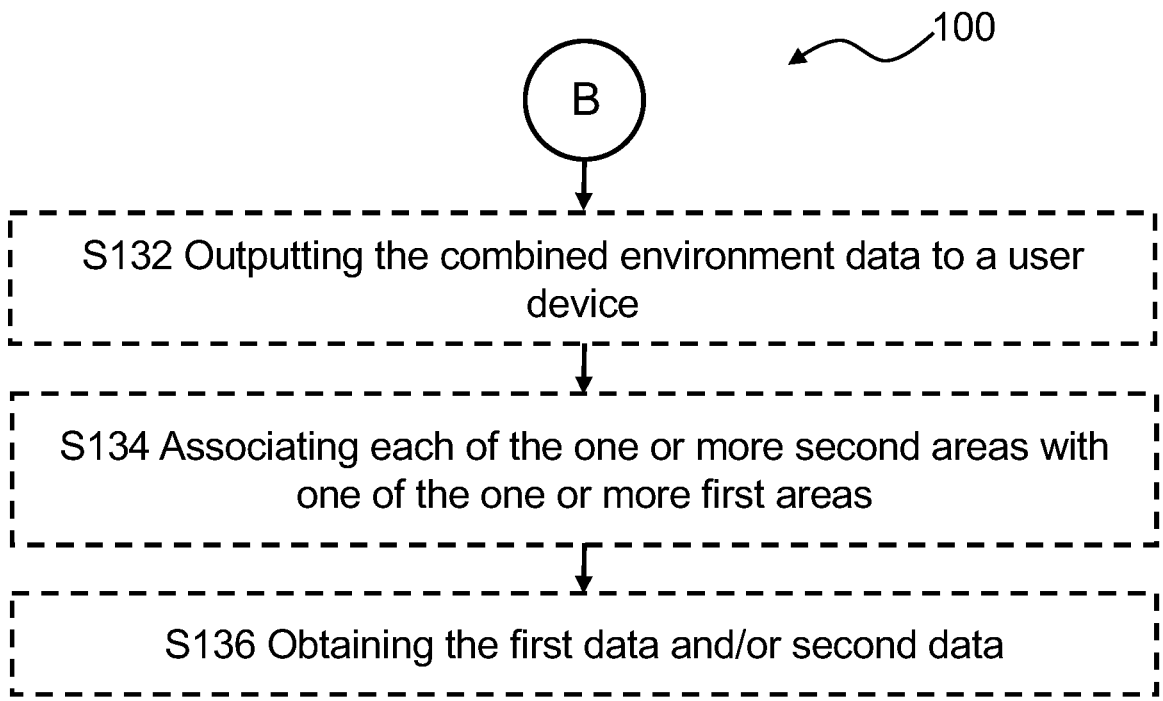

The server device 300 is optionally configured to perform any of the operations disclosed in FIGS. 2A-2C (such as any one or more of S102, S104, S106, S108, S110, S112, S114, S116, S118, S120, S122, S126, S128, S130, S132, S134, S136). In other words, the server device 300 may be configured to provide a combined environment. The operations of the server device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the server device 300 may be considered a method that the server device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 1). Memory circuitry 301 is considered a non-transitory computer readable medium.

Memory circuitry 301 may be configured to store information such as one or more of: first data, second data, third data, positional sensor data, image sensor data, activity sensor data, first parameters, second parameters, third parameters, first environment data, combined environment data, an avatar parameter, a second avatar parameter, an activity parameter, an availability parameter, a response parameter, a privacy status, a distance parameter, a proximity indicator, threshold and a communication parameter in a part of the memory.

FIGS. 2A-2C show flow diagrams of an example method 100 performed by a server device of the disclosure for providing a combined environment. For example, the server device 300 of FIG. 1, or any other server device of the disclosure, can perform the method 100.

In one or more example methods, the method 100 can be performed by a server device configured to provide a combined environment. In one or more example methods, the method 100 can comprise determining S102, based on first data, first parameters indicative of a first location. In one or more example methods, the method 100 can comprise generating S104, based on the first parameters, first environment data indicative of the first location. In one or more example methods, the method 100 can comprise determining S106, based on second data, second parameters indicative of a second location. In one or more example methods, the method 100 comprises associating S108 second parameters with first environment data for providing combined environment data. In one or more example methods, the method 100 comprises outputting S110 the combined environment data.

In one or more example methods, the method 100 comprises generating S112, based on sensor data, an avatar parameter indicative of a person in the second location or in the first location. In one or more example methods, the method 100 comprises associating S114 the avatar parameter with the combined environment data.

In one or more example methods, the sensor data comprises positional sensor data and/or image sensor data and/or activity sensor data.

In one or more example methods, the avatar parameter comprises an activity parameter based on the sensor data.

In one or more example methods, the method 100 comprises determining S116, based on third data, third parameters indicative of a third location. In one or more example methods, the method 100 comprises associating S118 the third parameters with the combined environment data.

In one or more example methods, the method 100 comprises generating S120, based on second sensor data, a second avatar parameter indicative of a second person in the third location In one or more example methods, the method 100 comprises associating S122 the second avatar parameter with the combined environment data.

In one or more example methods, the method 100 comprises determining S126 a distance parameter indicative of a distance between the avatar parameter and the second avatar parameter in the combined environment data. In one or more example methods, the method 100 can include comparing the distance parameter to a threshold. In one or more example methods, the method 100 can include determining if the distance parameter is below a threshold. In one or more example methods, the method 100 can include determining if the distance parameter is not below a threshold.

In one or more example methods, the method 100 comprises generating S128 a proximity indicator in accordance with the distance parameter being below a threshold. In one or more example methods, the method 100 comprises not generating S128 a proximity indicator in accordance with the distance parameter being not below a threshold.

In one or more example methods, the method 100 comprises generating S130 a communication parameter indicative of a communication between the avatar parameter and the second avatar parameter.

In one or more example methods, the method 100 comprises outputting S132 the combined environment data to a user device.

In one or more example methods, the first location is an office and the second location is a home.

In one or more example methods, the combined environment data comprises one or more first areas indicative of areas of the first location.

In one or more example methods, the second parameters comprise one or more second areas indicative of areas of the second location. In one or more example methods, the method 100 comprises associating S134 each of the one or more second areas with one of the one or more first areas.

In one or more example methods, the method 100 comprises obtaining S136 the first data and/or second data.

Figure 3:
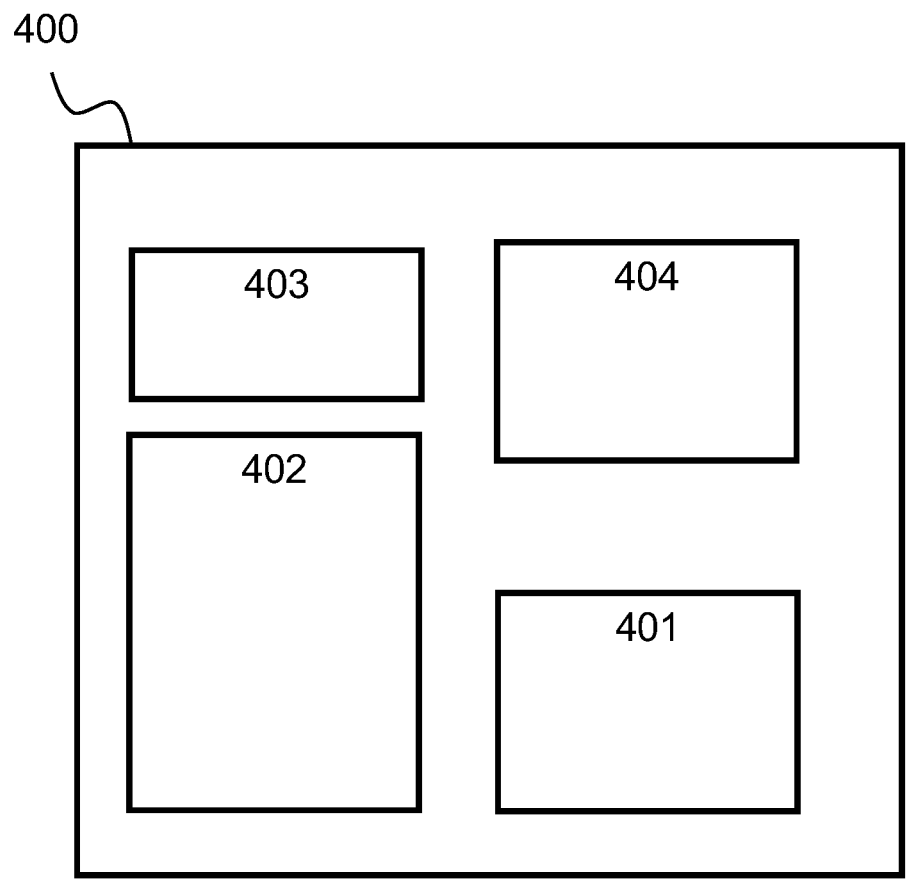
FIG. 3 is a block diagram illustrating an example electronic device according to the disclosure.

FIG. 3 shows a block diagram of an example electronic device 400 according to the disclosure. The electronic device 400 may be configured to display a combined environment. The electronic device 400 may be configured to display a virtual combined environment.

The electronic device 400 comprises memory circuitry 401. The electronic device 400 comprises processor circuitry 402. The electronic device 400 comprises interface circuitry 403. The electronic device 400 comprises display circuitry 404.

In one or more example electronic devices, the electronic device 400 comprises memory circuitry 401. The electronic device 400 comprises interface circuitry 403. In one or more example electronic devices, the electronic device 400 comprises display circuitry 404. In one or more example electronic devices, the electronic device 400 comprises processor circuitry 402. The electronic device 400 is configured to obtain combined environment data. In one or more example electronic devices, the combined environment data is indicative of a combination of a first location and a second location. In one or more example electronic devices, the combined environment data can comprise an avatar parameter indicative of a person in the second location. In one or more example electronic devices, the electronic device 400 can be configured to determine an activity parameter associated with the avatar parameter. In one or more example electronic devices, the electronic device 400 can be configured to obtain, based on the activity parameter, an updated avatar parameter indicative of the person in the second location. In one or more example electronic devices, the electronic device 400 display a first user interface object representative of the updated avatar parameter. The electronic device 400 is configured to display a second user interface object representative of the combined environment data.

In one or more example electronic devices, the electronic device 400 can be a user device and/or a display device. In one or more example electronic devices, the electronic device 400 can be one or more of a monitor, tablet, mobile phone, smart phone, laptop, a visor, a projector, and computer. In one or more example electronic devices, the electronic device 400 can be a monitor. In one or more example electronic devices, the electronic device 400 can be a tablet. In one or more example electronic devices, the electronic device 400 can be a mobile phone, such as a smart phone. In one or more example electronic devices, the electronic device 400 can be a laptop. In one or more example electronic devices, the electronic device 400 can be a computer. In one or more example electronic devices, the electronic device 400 can be a visor. In one or more example electronic devices, the electronic device 400 can be a projector. In one or more example electronic devices, the electronic device 400 can be configured to provide a virtual reality image.

The electronic device 400 may be located in the first location and/or the second location.

The electronic device 400 can be configured to obtain the combined environment data from another electronic device. The electronic device 400 can be configured to obtain the combined environment data from a server device, such as server device 300.

The electronic device 400 may be configured to generate sensor data. The sensor data may comprise audio data. The sensor data may comprise video data. The sensor data may comprise one or more of: audio data and video data. The sensor data may be location data, such as positioning data. The electronic device 400 may be configured to determine an activity parameter and/or an availability parameter.

The electronic device 400 may be configured to provide second data. For example, the electronic device 400 may provide second data to a server device, such as server device 300.

The electronic device 400 may be configured to determine, based on second data, second parameters indicative of the second location. The electronic device 400 may be configured to provide the second parameters. For example, the electronic device 400 may provide the second parameters data to a server device, such as server device 300.

The activity parameter may be indicative of an activity of the person indicated by the avatar parameter. The activity parameter may be based on sensor data. Whenever the person indicated by the avatar parameter performs an activity, the electronic device 400 can be configured to obtain an updated avatar parameter indicative of the person in the second location. For example, if the person moves, the avatar parameter may be updated to the updated avatar parameter to be indicative of the new location of the user. If a person is holding the electronic device 400, such as a mobile phone, the electronic device can be configured to determine the activity parameter of the person.

The electronic device 404 can be configured to display one or more user interface objects. The display circuitry 404 may be a screen. For example, the screen may be a screen comprised in a mobile phone, such as a smart phone screen. The display circuitry 404 may be a touch screen. The display circuitry 404 may be a monitor. The display circuitry 404 may be a visual screen. The display circuitry 404 may be one or more of: a screen, a touch screen, a monitor, and a visual screen.

A user interface object refers herein to a graphical representation of an object that is displayed on the display, such as via display circuitry 404, of the electronic device 400. The user interface object may be user-interactive, or selectable by a user input. For example, an image (e.g., icon), a button, and text (e.g., hyperlink) each optionally constitute a user interface object. The user interface object may form part of a widget. A widget may be seen as a mini-application that may be used by the user, and created by the user. A user interface object may comprise a prompt, application launch icon, and/or an action menu. In one or more examples, a user interface object may be representative of an avatar of a person, such as representative of an avatar parameter.

The display circuitry 404 may be configured to display visual output to a user. The visual output optionally includes graphics, text, icons, video, and any combination thereof (collectively termed "graphics"). For example, some or all of the visual output may be seen as corresponding to user-interface objects.

The processor circuitry 402 of the electronic device 400 may be configured to display, on the display, one or more user interfaces, such as user interface screens, including a first user interface and/or a second user interface. A user interface may comprise one or more, such as a plurality of user interface objects. For example, a first user interface may comprise a first user interface object and/or a second user interface object disclosed herein.

A user interface object, such as the first user interface object and/or the second user interface object, may represent an avatar parameter and/or a combined environment data.

The first user interface object may comprise an icon representative of a person and/or an image of a person represented by the updated avatar parameter. The first user interface object may be number indicative of the person represented by the updated avatar parameter. The first user interface object may be placeholder indicative of the person represented by the updated avatar parameter. The first user interface object may be two dimensional and/or three dimensional.

The first user interface object may be representative of the electronic device 400. The first user interface object may be representative of a person with the electronic device 400.

The second user interface object may be indicative of the combined environment data. For example, the second user interface object may show a layout of an office, such as including different areas, rooms, or locations. The layout can include the first user interface object. The first user interface object can be in one of the different areas, rooms, or locations of the second user interface object. The second user interface object may be two dimensional and/or three dimensional.

The first user interface object may be representative of the electronic device 400 and/or associated person and displayed with respect to the second user interface object. In one or more example electronic devices, a person may be able to view their location with respect to the combined environment data.

For example, the electronic device 400 can be a mobile phone, such as a smart phone held by a person. The person would be able to see the combination of the first location and the second location displayed on a display circuitry or a screen on the mobile phone or smart phone. For example, the second location could be the person's home and the first location could be the person's office. The person could then see their own avatar, such as the first user interface object, shown on a combination of the first location and the second location, such as the second user interface object, which is displayed on the mobile phone, such as smart phone. The person could also see other coworker avatars, such as other user interface objects, displayed on the display circuitry, such as on a smart phone screen.

In one or more example electronic devices, the electronic device 400 is configured to receive user input associated with the first user interface object representative. In one or more example electronic devices, the electronic device 400 is configured to receive user input associated with the second user interface object representative. In one or more example electronic devices, the electronic device 400 is configured to receive user input associated with the first user interface object representative and/or the second user interface object representative.

User input can be, for example, selection of a user interface object. User input can be touch input, such as tap input. User input can be keypad input. User input can be wireless input. A user input, such as first user input and/or second user input, may comprise a touch (e.g. a tap, a force touch, a long press), and/or movement of contact (e.g. a swipe gesture, e.g. for toggling). The movement on contact may be detected by a touch sensitive surface, e.g. on a display circuitry 404 of the electronic device 400. Thus, the display circuitry 404 may be a touch sensitive display. A user input, such as first user input and/or second user input, may comprise a lift off. A user input, such as first user input and/or second user input, may comprise a touch and a movement followed by a lift off. For example, a person could use the touchscreen of a smart phone to provide user input.

In one or more example electronic devices, the user input is configured to perform one or more of an interaction, a communication, and a movement. In one or more example electronic devices, the user input is configured to perform one or more of an interaction, a communication, and a movement of the avatar parameter and/or the updated avatar parameter. In one or more example electronic devices, the user input is configured to perform an activity of the avatar parameter and/or the updated avatar parameter.

In one or more example electronic devices, the electronic device 400 is configured to display a third user interface object representative of a notification.

The third user interface object may be an image. The third user interface object may be a sound and an image. The third user interface object may be two dimensional and/or three dimensional. A user could be able to see the third user interface object displayed on a smart phone screen.

In one or more example electronic devices, the electronic device 400 is configured to display a fourth user interface object representative of an activity parameter and/or an availability parameter. In one or more example electronic devices, the electronic device 400 is configured to display a fourth user interface object representative of an availability parameter, such as including a response parameter and/or a privacy status. In one or more example electronic devices, the electronic device 400 is configured to display a fourth user interface object representative of an activity parameter.

The fourth user interface object may be an image. The fourth user interface object may be a sound and an image. The fourth user interface object may be two dimensional and/or three dimensional. A user could be able to see the fourth user interface object displayed on a smart phone screen.

The electronic device 400 is optionally configured to perform any of the operations disclosed in FIG. 3 (such as any one or more of S202, S204, S206, S208, S210, S212). In other words, the electronic device 400 may be configured to provide a combined environment. The operations of the electronic device 400 may be embodied in the form of executable logic routines (for example, lines of code, software programs, etc.) that are stored on a non-transitory computer readable medium (for example, memory circuitry 401) and are executed by processor circuitry 402).

Furthermore, the operations of the electronic device 400 may be considered a method that the electronic device 400 is configured to carry out. Also, while the described functions and operations may be implemented in software, such functionality may also be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 3). Memory circuitry 401 is considered a non-transitory computer readable medium.

Memory circuitry 401 may be configured to store information such as one or more of: combined environment data, avatar parameter, activity parameter, updated avatar parameter, first user interface object, second user interface object, user input, and a third user interface object in a part of the memory. Memory circuitry 401 may be configured to store information such as combined environment data. Memory circuitry 401 may be configured to store information such as an avatar parameter. Memory circuitry 401 may be configured to store information such as an activity parameter. Memory circuitry 401 may be configured to store information such as an updated avatar parameter. Memory circuitry 401 may be configured to store information such as a first user interface object.

Memory circuitry 401 may be configured to store information such as a second user interface object. Memory circuitry 401 may be configured to store information such as a user input. Memory circuitry 401 may be configured to store information such as a third user interface object.

Figure 4:
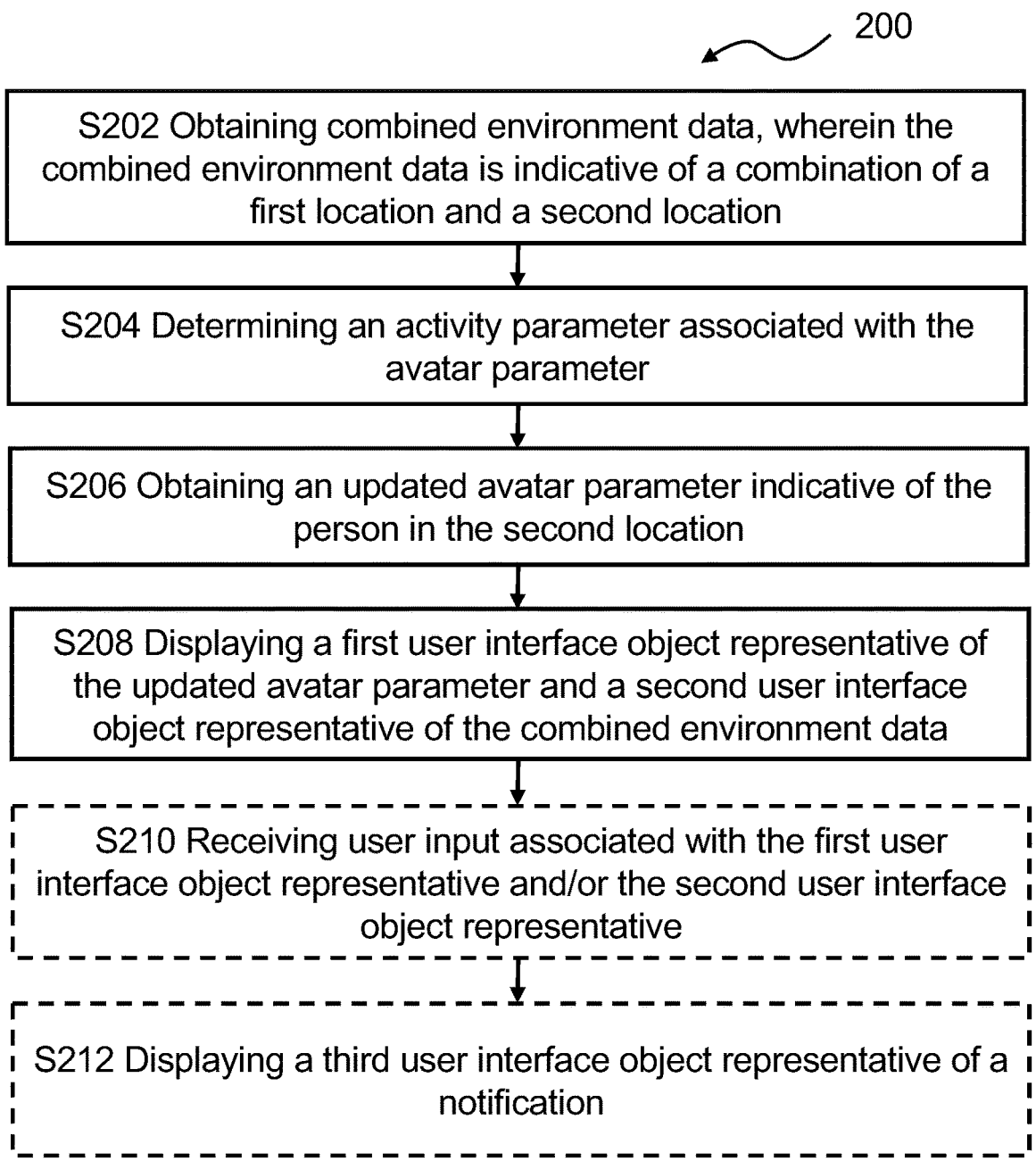
FIG. 4 is a flow-chart illustrating an example method, performed in an electronic device, according to this disclosure.

FIG. 4 shows flow diagrams of an example method 400 performed by an electronic device of the disclosure. For example, the electronic device 400 of FIG. 3, or any other electronic device of the disclosure, can perform the method 200.

In one or more example methods, the method 200 can be performed by an electronic device. In one or more example methods, the method 200 comprises obtaining S202 combined environment data. In one or more example methods, the combined environment data can be indicative of a combination of a first location and a second location. In one or more example methods, the combined environment data can comprise an avatar parameter indicative of a person in the second location. In one or more example methods, the method 200 can comprise determining S204 an activity parameter associated with the avatar parameter. In one or more example methods, the method 200 can comprise obtaining S206, based on the activity parameter, an updated avatar parameter indicative of the person in the second location. In one or more example methods, the method 200 comprises displaying S208 a first user interface object representative of the updated avatar parameter and a second user interface object representative of the combined environment data.

In one or more example methods, the method 200 comprises receiving S210 user input associated with the first user interface object representative and/or the second user interface object representative.

In one or more example methods, the user input is configured to perform one or more of an interaction, a communication, and a movement.

In one or more example methods, the method 200 comprises displaying S212 a third user interface object representative of a notification.

Figure 5:
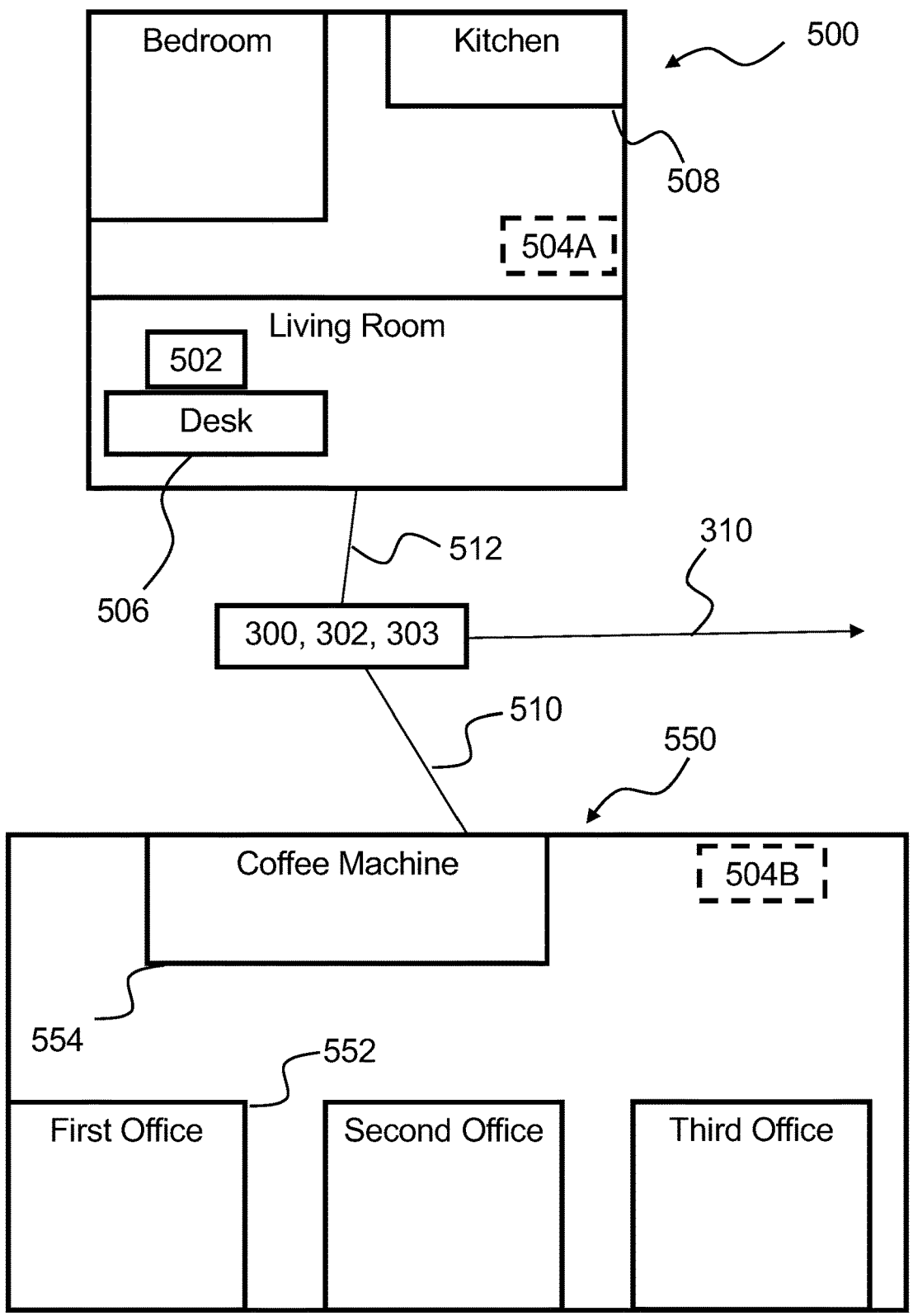
FIG. 5 is a schematic representation of an example scenario including an example server device of the disclosure.

FIG. 5 illustrates a schematic representation of an example scenario including an example server device of the disclosure.

As shown, first parameters of as a first location, such as a physical office 550, are configured to be determined by processor circuitry 302 of a server device 300 based on first data 510. Second parameters of a second location 500, such as a physical apartment, are configured to be determined by processor circuitry 302 of a server device 300 based on second data 512.

The processor circuitry 302 of the server device 300 is configured to generate first environment data indicative of the first location 550 based on first data 510. The processor circuitry 302 of the server device 300 is configured to associate the second parameters with the first environment data for providing combined environment data 310.

The processor circuitry 302 of the server device 300 is configured to output the combined environment data 310, such as via interface circuitry 303.

The first location 550 and/or the second location 500 may include one or more sensors 504A/504B respectively. The sensors 504A/504B can determine the first data 510 and the second data 512 respectively, and the server device 300 can be configured to obtain the first data 510 and the second data 512.

As shown, the second location 500 may contain a person 502, as well as a desk area 506 and a kitchen 508. The processor circuitry 302 of the server device 300 is configured to associate second parameters, based on second data 512, with first environment data, based on the first parameters for provision of the combined environment data 310.

For example, the processor circuitry 302 of the server device 300 can be configured to associate, such as map, the desk area 506 of the second location 500 with a first office area 552 of the first location 550. The processor circuitry 302 of the server device 300 can be configured to associate, such as map, the kitchen 508 of the second location 500 with a coffee break area 554 of the first location 550.

Figure 6:
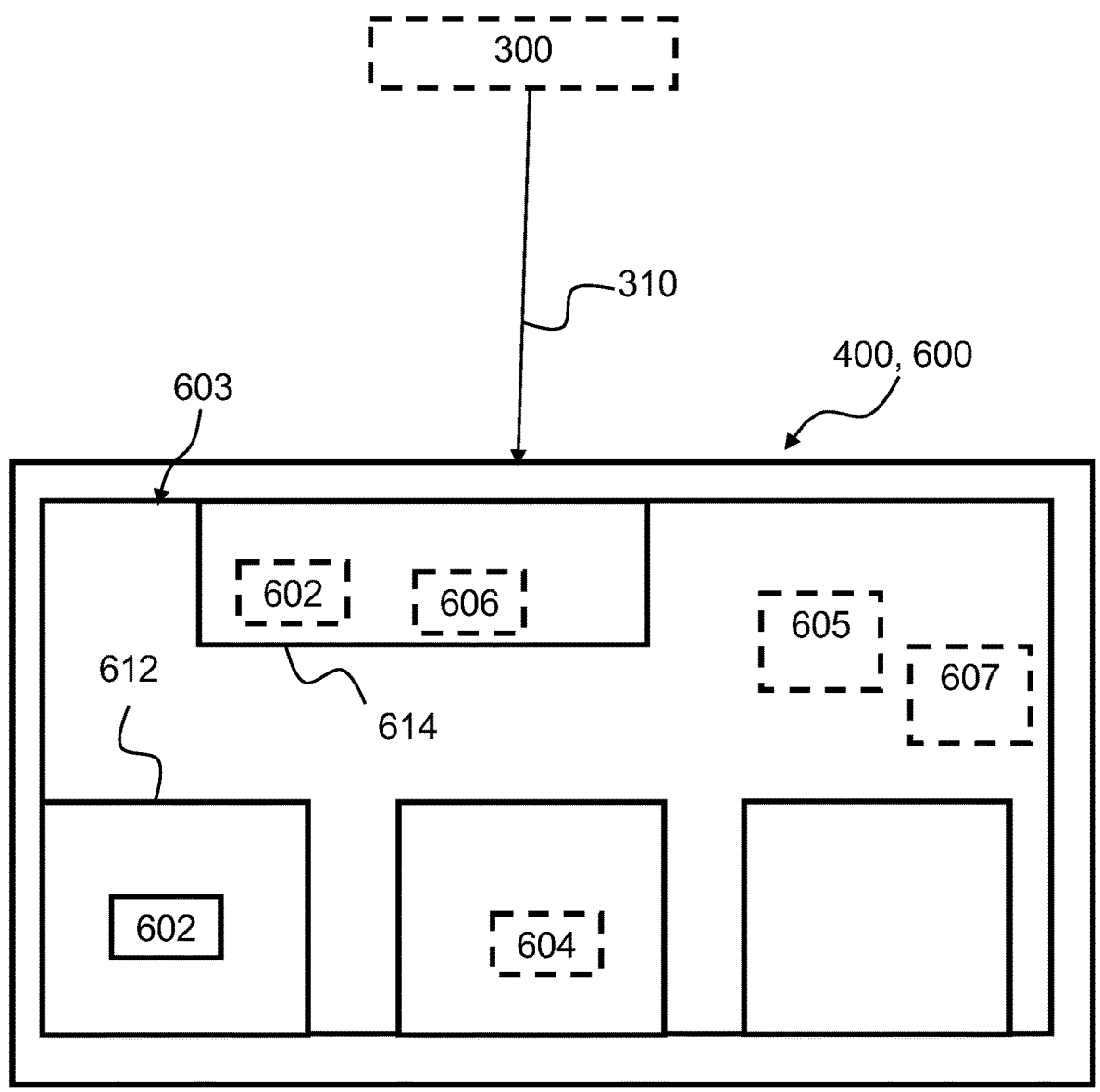
FIG. 6 is a schematic illustration of an example user interface according to the disclosure.

FIG. 6 illustrates a schematic of an example electronic device according to the disclosure. An electronic device 400, such as a user device configured to display a user interface 600, is configured to obtain the combined environment data 310. The electronic device 400 can be configured to obtain the combined environment data 310 from a server device, such as server device 300. The electronic device 400 is configured to display, such as via display circuitry 404 for provision of the user interface 600, one or more user interface objects. The electronic device 400 can be a mobile phone, such as a smart phone, for example, having a screen to display the user interface 600.

As shown, the electronic device 400 is configured to display a first user interface object 602, such as an avatar representative of an avatar parameter and/or an updated avatar parameter which is indicative of person 502 associated with, such as mapped to, the first location 500, on the user interface 600. The electronic device 400 may be located at the first location. The electronic device 400 is configured to display a second user interface object 603 representative of the combined environment data 310 on the user interface 600. The electronic device 400 can be configured to display a third user interface object 605 representative of a notification on the user interface 600. The electronic device 400 can be configured to display a fourth user interface object 607 representative of an activity parameter and/or a context parameter and/or an availability parameter on the user interface 600. The notification may indicate that another person represented by a user interface object requests a communication. The first user interface object 602 and/or the second user interface object 603 and/or the third user interface object 605 and/or the fourth user interface object 607 may form part of the user interface 600, such as a user interface screen.

As shown, the first user interface object 602 is located in the area 612 of the user interface 600. User interface object 612 is representative of an area, such as the first office area 552 of the first location 550 of FIG. 5 based on the combined environment data 310 as the desk area 506 of the first location 500 of FIG. 5 which has been associated with the first environment data representative of the first office area 552 of FIG. 5. User interface object 612 can be part of the second user interface object 603.

User interface object 614 is representative of an area, such as the coffee break area 554 of the first location 550 of FIG. 5 based on the combined environment data 310. Further, the kitchen 508 of the first location 500 of FIG. 5 has been associated with the first environment data representative of the coffee break area 554 of FIG. 5. User interface object 614 can be part of the second user interface object 603.

If the person 502 moves to the kitchen 508, the electronic device 400 is configured to obtain (such as from the server device 300), based on an activity parameter, an updated avatar parameter indicative of the person 502 of FIG. 5. The activity parameter can be based on sensor data from sensor 504A of FIG. 5. The electronic device 400 is configured to display the first user interface object 602 representative of the updated avatar parameter in the area represented by user interface object 614.

Further locations and persons can optionally be associated with user interface 600, including a number of user interface objects 604, 606 (such as avatars). A full workplace, such as included in combined environment data 310, can be shown on a user device 400, such as on the user interface 600, even though the persons may be located in many different locations.

A user may be able to see if other user interface objects, such as avatars, are in the area represented by user interface object 614, such as user interface object 606, which may provide an understanding that a person represented by the user interface object 606 is available to communicate. A notification represented by user interface object 605 may be displayed to illustrate the availability or wish for communication between the persons represented by 606 and 602. The user interface 600 may be configured to display a third user interface object 605 when the first user interface object 602 and user interface object 606 are both in the area represented by user interface object 614. The user interface 600 may be configured to display a fourth user interface object 607, such as when the user is busy with an activity as indicated by an activity parameter and/or a context parameter and/or an availability parameter, such as on a phone call.

Examples of methods and products (electronic devices and/or server devices) according to the disclosure are set out in the following items:

Item 1. A server device configured to provide a combined environment, the server device comprising:
  memory circuitry;
  interface circuitry; and
  processor circuitry, wherein the processor circuitry is configured to:
    determine, based on first data, first parameters indicative of a first location;
    generate, based on the first parameters, first environment data indicative of the first location;
    determine, based on second data, second parameters indicative of a second location;
    associate the second parameters with the first environment data for providing combined environment data; and
    output the combined environment data.

Item 2. The server device of Item 1, wherein the processor circuitry is configured to:
  generate, based on sensor data, an avatar parameter indicative of a person in the second location or in the first location; and
  associate the avatar parameter with the combined environment data.

Item 3. The server device of Item 2, wherein the sensor data comprises positional sensor data and/or image sensor data and/or activity sensor data.

Item 4. The server device of Item 2 or Item 3, wherein the avatar parameter comprises an activity parameter based on the sensor data.

Item 5. The server device of any one of Items 1-4, wherein the processor circuitry is configured to:
  determine, based on third data, third parameters indicative of a third location; and
  associate the third parameters with the combined environment data.

Item 6. The server device of Item 5, wherein the processor circuitry is configured to:
  generate, based on second sensor data, a second avatar parameter indicative of a second person in the third location; and associate the second avatar parameter with the combined environment data.

Item 7. The server device of Item 6, wherein the processor circuitry is configured to determine a distance parameter indicative of a distance between the avatar parameter and the second avatar parameter in the combined environment data.

Item 8. The server device of Item 7, wherein in accordance with the distance parameter being below a threshold, the processor circuitry is configured to generate a proximity indicator.

Item 9. The server device of any one of Items 6-8, wherein the processor circuitry is configured to generate a communication parameter indicative of a communication between the avatar parameter and the second avatar parameter.

Item 10. The server device of any one of Items 1-9, wherein the processor circuitry is configured to output the combined environment data to a user device.

Item 11. The server device of any one of Items 1-10, wherein the first location is an office and the second location is a home.

Item 12. The server device of any one of Items 1-11, wherein the combined environment data comprises one or more first areas indicative of areas of the first location.

Item 13. The server device of Item 12, wherein the second parameters comprise one or more second areas indicative of areas of the second location, and wherein the processor circuitry is configured to associate each of the one or more second areas with one of the one or more first areas.

Item 14. The server device of any one of Items 1-13, wherein the server device is configured to obtain the first data and/or second data.

Item 15. An electronic device comprising:
memory circuitry;
interface circuitry;
display circuitry; and
processor circuitry;
wherein the electronic device is configured to:
    obtain combined environment data, wherein the combined environment data is indicative of a combination of a first location and a second location, and wherein the combined environment data comprises an avatar parameter indicative of a person in the second location;
    determine an activity parameter associated with the avatar parameter;
    obtain, based on the activity parameter, an updated avatar parameter indicative of the person in the second location; and
    display a first user interface object representative of the updated avatar parameter and a second user interface object representative of the combined environment data.

Item 16. The electronic device of Item 15, wherein the electronic device is configured to receive user input associated with the first user interface object representative and/or the second user interface object representative.

Item 17. The electronic device of any of Items 15-16, wherein the user input is configured to perform one or more of an interaction, a communication, and a movement.

Item 18. The electronic device of any of Items 15-17, wherein the electronic device is configured to display a third user interface object representative of a notification.

Item 19. The electronic device of any of Items 15-18, wherein the electronic device is a mobile phone.

Item 20. A method, performed by a server device configured to provide a combined environment, the method comprising:
    determining (S102), based on first data, first parameters indicative of a first location;
    generating (S104), based on the first parameters, first environment data indicative of the first location;
    determining (S106), based on second data, second parameters indicative of a second location;
    associating (S108) the second parameters with the first environment data for providing combined environment data; and
    outputting (S110) the combined environment data.

Item 21. The method of Item 20, the method comprising:
    generating (S112), based on sensor data, an avatar parameter indicative of a person in the second location or in the first location; and
    associating (S114) the avatar parameter with the combined environment data.

Item 22. The method of Item 21, wherein the sensor data comprises positional sensor data and/or image sensor data and/or activity sensor data.

Item 23. The method of Item 21 or Item 22, wherein the avatar parameter comprises an activity parameter based on the sensor data.

Item 24. The method of any one of Items 20-23, the method comprising:
    determining (S116), based on third data, third parameters indicative of a third location; and
    associating (S118) the third parameters with the combined environment data.

Item 25. The method of Item 24, the method comprising:
    generating (S120), based on second sensor data, a second avatar parameter indicative of a second person in the third location; and
    associating (S122) the second avatar parameter with the combined environment data.

Item 26. The method of Item 25, the method comprising determining (S126) a distance parameter indicative of a distance between the avatar parameter and the second avatar parameter in the combined environment data.

Item 27. The method of Item 26, wherein in accordance with the distance parameter being below a threshold, the method comprising generating (S128) a proximity indicator.

Item 28. The method of any one of Items 25-27, the method comprising generating (S130) a communication parameter indicative of a communication between the avatar parameter and the second avatar parameter.

Item 29. The method of any one of Items 20-28, the method comprising outputting (S132) the combined environment data to a user device.

Item 30. The method of any one of Items 20-29, wherein the first location is an office and the second location is a home.

Item 31. The method of any one of Items 20-30, wherein the combined environment data comprises one or more first areas indicative of areas of the first location.

Item 32. The method of Item 31, wherein the second parameters comprise one or more second areas indicative of areas of the second location, and the method comprising associating (S134) each of the one or more second areas with one of the one or more first areas.

Item 33. The method of any one of Items 20-32, the method comprising obtaining (S136) the first data and/or second data.

Item 34. A method, performed by an electronic device, the method comprising:
    obtaining (S202) combined environment data, wherein the combined environment data is indicative of a combination of a first location and a second location, and wherein the combined environment data comprises an avatar parameter indicative of a person in the second location;

determining (S204) an activity parameter associated with the avatar parameter;

obtaining (S206), based on the activity parameter, an updated avatar parameter indicative of the person in the second location; and displaying (S208) a first user interface object representative of the updated avatar parameter and a second user interface object representative of the combined environment data.

Item 35. The method of Item 34, the method comprising receiving (S210) user input associated with the first user interface object representative and/or the second user interface object representative.

Item 36. The method of any one of Items 34-35, wherein the user input is configured to perform one or more of an interaction, a communication, and a movement.

Item 37. The method of any one of Items 34-36, the method comprising displaying (S212) a third user interface object representative of a notification.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-6 comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. A server device configured to provide a combined environment, the server device comprising:
    memory circuitry;
    interface circuitry; and
    processor circuitry, wherein the processor circuitry is configured to:
        determine, based on first data, first parameters indicative of a first location, the first parameters indicative of at least a plurality of areas and a plurality of objects at the first location;
        generate, based on the first parameters, first environment data indicative of the first location;
        determine, based on second data, second parameters indicative of a second location, the second parameters indicative of at least a plurality of areas and a plurality of objects at the second location;
        receive an input from a user, the input from the user defines a single area of the plurality of areas of the second location to be associated with a single area of the plurality of areas of the first location;
        associate the area of the second location with the area of the first location;
        generate combined environment data based on the association of the second area with the first area such that at least a portion of the plurality of objects from the area of the second location are merged with the area of the first location to provide the combined environment data, the combined environment data is indicative of a combination of the first location and the second location; and
        output the combined environment data.

2. The server device of claim 1, wherein the processor circuitry is configured to:
    generate, based on sensor data, an avatar parameter indicative of a person in the second location or in the first location; and
    associate the avatar parameter with the combined environment data.

3. The server device of claim 2, wherein the sensor data comprises positional sensor data and/or image sensor data and/or activity sensor data.

4. The server device of claim 2, wherein the avatar parameter comprises an activity parameter based on the sensor data.

5. The server device of claim 1, wherein the processor circuitry is configured to:
   determine, based on third data, third parameters indicative of a third location; and
   associate the third parameters with the combined environment data.

6. The server device of claim 5, wherein the processor circuitry is configured to:
   generate, based on second sensor data, a second avatar parameter indicative of a second person in the third location; and
   associate the second avatar parameter with the combined environment data.

7. The server device of claim 6, wherein the processor circuitry is configured to determine a distance parameter indicative of a distance between the avatar parameter and the second avatar parameter in the combined environment data.

8. The server device of claim 7, wherein in accordance with the distance parameter being below a threshold, the processor circuitry is configured to generate a proximity indicator.

9. The server device of claim 1, wherein the processor circuitry is configured to determine a distance parameter, in the combined environment, indicative of a distance between a first avatar parameter indicative of a person in the first location and a second avatar parameter indicative of a person in the second location data, wherein in accordance with the distance parameter being below a threshold, generating a proximity indicator indicating that the first and second avatar parameters are located within a same area of the combined environment.

10. The server device of claim 1, wherein the area of the first location and the area of the second location are detected using density-based spatial clustering of applications with noise (DBSCAN).

11. The server device of claim 2, wherein the first location is an office building, the area of the first location is an employee's office, the second location is the employee's house, and the area of the second location is the employee's home office, the processor circuitry is configured to associate the employee's home office to the employee's office in the office building such that when a user enters the area of the second location, the user's avatar is visualized in the combined environment data as being located in the area of the first location.

* * * * *